Dec. 13, 1938.  C. R. HANNA  2,140,358
SHOCK ABSORBER
Filed Sept. 22, 1931   2 Sheets-Sheet 1

INVENTOR
Clinton R. Hanna.
BY
ATTORNEY

Patented Dec. 13, 1938

2,140,358

UNITED STATES PATENT OFFICE 2,140,358

SHOCK ABSORBER

Clinton R. Hanna, Pittsburgh, Pa., assignor to Westinghouse Electric & Manufacturing Company, a corporation of Pennsylvania Application September 22, 1931, Serial No. 564,281

59 Claims. (Cl. 188—88)

My invention relates, generally, to shock absorbers, particularly shock absorbers for vehicles, and constitutes an improvement in the shock absorbers covered in my copending application, Serial No. 551,390, filed July 17, 1931.

In the following description, the operation of my invention will be described in connection with a vehicle, although it is to be understood that it may be utilized in connection with other apparatus having relatively movable masses connected by a resilient member.

Also, in this description, the vehicle may be considered as having two parts which may, in the interest of clarity, be conveniently referred to as the sprung and the unsprung masses. The sprung mass comprises that part of the vehicle which is supported by the springs and the unsprung mass comprises the axle and wheels and any other parts that may be mounted thereon.

An object of my invention is to provide for resisting the relative movements of the sprung and the unsprung masses of a vehicle in order to insure smooth and improved riding qualities of the sprung mass.

A more specific object of my invention is to provide for resisting the relative movements of the sprung and the unsprung masses of a vehicle by a force that is proportional to the rate of change of the vertical velocities of one of the masses.

A further object of my invention is to provide for resisting the relative movements of the sprung and the unsprung masses of a vehicle with a force that is determined by the rate of change of the increasing vertical velocities of the sprung mass, said force being large when the rate of change is large and small when the rate of change is small.

Another object of my invention is to provide for resisting the relative movements of the sprung and the unsprung masses of the vehicle with a relatively small force during the periods when the vertical velocity of the sprung mass is constant or decreasing.

It is also an object of my invention to provide for reducing the frequency of the free oscillations of the sprung mass of a vehicle, whereby it is less likely to be influenced by the undulations of the road surface.

A still further object of my invention is to provide for resisting the relative movements of the sprung and the unsprung masses of a vehicle by a force that is a predetermined large fraction of every force tending to increase the vertical velocity of the sprung mass, thereby leaving only a predetermined small fraction to accelerate the sprung mass.

It is also an object of my invention to provide for initiating and increasing the rate of absorption of the kinetic energy of the unsprung mass of a vehicle when such unsprung mass reaches its maximum velocity, or at a time slightly thereafter, and for continuously absorbing the kinetic energy from the unsprung mass until it is reduced to zero, thereby insuring good traction between the wheels of the vehicle and the road surface.

It is a further object of my invention to provide for absorbing the kinetic energy of the unsprung mass when it reaches its maximum vertical velocity, or at a time slightly thereafter, to insure good traction between the wheels and the irregularities of the road surface.

Further objects of my invention will hereinafter become apparent.

For a fuller understanding of the nature and objects of my invention, reference should be made to the following detailed description taken in connection with the accompanying drawings, in which.

Referring now to the drawings, the reference character 10 designates a housing in which the shock absorber fluid is retained and in which the various mechanical parts of the shock absorber are mounted. The level of the fluid is indicated by the line 9.

The lower part of the housing 10 constitutes a horizontal cylinder having a removable head 12. A two-way piston 11 is mounted in the cylinder and may be actuated, in accordance with the relative movement of the sprung and unsprung masses of a vehicle, by means of an arm 16 that is connected to the axle (unsprung mass).

As will be observed, the piston 11 is, of course, shorter than the cylinder, thereby providing chambers 17 and 18 for subjecting the fluid contained therein to pressure for resisting the relative movements of the sprung and unsprung masses of the vehicle.

Figure 1:
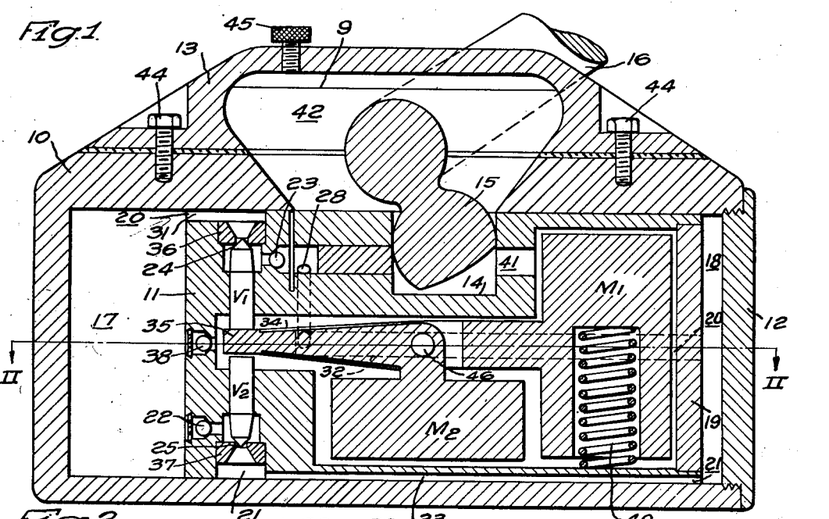
Figure 1 is a view, in vertical section, of a shock absorber embodying the features of my invention.

The actuating arm 16 may be journaled in the housing 10 in any suitable manner to enable it to function as a crank to reciprocate the piston 11 within the cylinder. Preferably, as shown in Fig. 1, the arm 16 is provided with a cam 15 that is disposed to engage a suitably shaped recess 14 in the piston 11. The free end of the actuating arm may be connected to the axle (unsprung mass) of the vehicle, in any suitable manner, (not shown). In this instance it has been deemed unnecessary to show the manner in which the housing 10 may be mounted on the sprung mass of the vehicle, since the general construction of such mounting is a matter of common knowledge.

Figure 2:
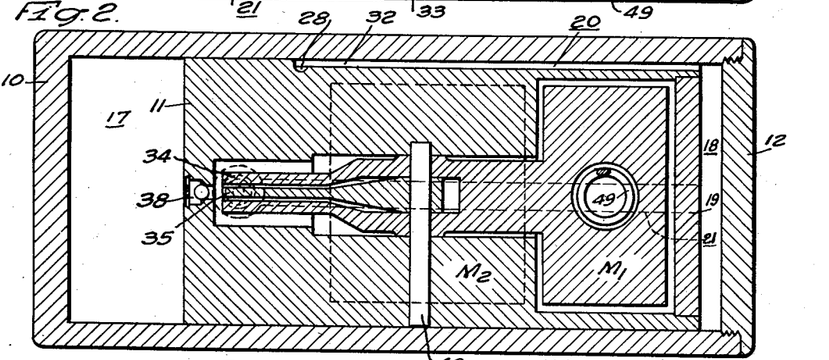
Fig. 2 is a view, in horizontal section, of the shock absorber taken along the line II—II of Fig. 1.

Therefore, as the sprung and unsprung masses of the vehicle approach each other, as they will do, after an irregularity in the road surface is encountered, the piston 11, shown in Figs. 1 and 2, moves to the right, and when the masses move in the opposite direction, or separate, the piston 11 moves to the left. In this manner, the piston 11 may operate to resist the relative movements of the sprung and unsprung masses, regardless of whether they are approaching or separating from each other.

In this embodiment of the invention, the piston 11 carries two masses $M_1$ and $M_2$ which are pivotally mounted on a pin 46 and which will be referred to hereinafter as the control masses. Each of these masses is adapted to operate two oppositely disposed poppet valves $V_1$ and $V_2$, by reason of the small end of each mass engaging one or the other of the confronting ends of the alined poppet valves.

Also, in order to provide for the interchange of fluid between the chambers 17 and 18, the piston 11 is provided with two fluid passages 20 and 21 that extend throughout the length of the piston.

As the piston 11 is actuated to the left, the fluid in chamber 17 flows through the fluid passage 20 in the following manner: First, through a groove 31 that is provided at the top of the piston 11 and which leads to the valve $V_1$, the opening of the valve $V_1$, the ball check valve 23, the inclined opening 28, and thence to the chamber 18 through a groove 32 that is provided at the side of the piston.

In a similar manner as the piston 11 is actuated to the right, as viewed in the drawings, the fluid in the chamber 18 flows through the passage 21 in the following manner: first, through a groove 33 that is provided at the bottom of the piston and which leads to the valve $V_2$, the opening of the valve $V_2$, and thence to the chamber 17 through the ball check valve 22.

As is manifest, the ball check valve 22 provides a positive check to the flow of the fluid through the fluid passage 21 when the piston is actuated to the left, while at the same time, the ball check valve 23 operates to permit the fluid to flow freely through the fluid passage 20.

Similarly, when the piston is actuated to the right, the ball check valve 23 provides a positive check to the flow of the fluid through the fluid passage 20, while at the same time, the ball check valve 22 operates to permit the fluid to flow freely through the fluid passage 21.

I have found that the best riding qualities of a vehicle are attained when a shock absorber provides for resisting the relative movements of the sprung and unsprung masses in accordance with the rate of change of the vertical velocities of the sprung mass. The truth of this statement is substantiated by the fact that a resisting force responsive to the rate of change of the vertical velocities of the sprung mass provides for materially lengthening the period of the free oscillations of the sprung mass, as though an additional mass were added to the sprung mass for that part of the cycle during which the shock absorber is effective. This not only insures a smooth and easy movement of the sprung mass but also provides for reducing the resonance frequency of the movements of the sprung mass, whereby it is less likely to be influenced by the undulations of the road surface than it would be if the shock absorber did not function to alter the wave form of the movements.

In order to accomplish the foregoing, I provide for controlling the flow of the fluid through the fluid passages 20 and 21 by inertia control poppet valves $V_1$ and $V_2$. Although I have shown a pair of conical faced poppet valves, it is to be understood that I do not wish to limit myself to this particular type of valve, since there are other types of valves that function substantially in the same manner. The valves may be mounted and operated in any suitable manner to control the flow of the fluid through the fluid passages 20 and 21.

As shown, the valves are slidably mounted in the piston 11 and are controlled by the control masses $M_1$ and $M_2$. The valves $V_1$ and $V_2$ respectively, are provided with valve seats 24 and 25 and the valves assume such relationship thereto when actuated by the movement of the control masses $M_1$ and $M_2$ for resisting the flow of the fluid through the fluid passages 20 and 21 that a force is provided for resisting the relative movement of the sprung and unsprung masses of the vehicle in accordance with the rate of change of the vertical velocities of the sprung and unsprung masses.

In order to subject the fluid in the chambers 17 and 18 to a pressure that is proportional to the rate of change of the vertical velocities of the sprung mass, it is necessary that the fluid pressure, as well as the force of the control mass $M_1$, shall influence the opening of the valves. Tests conducted on valves of different types disclose that a poppet valve, as shown in the embodiment of my invention, gives the best results, not only because it presents an area against which the fluid pressure in the piston chambers can act to overcome the force exerted by the control mass, but also because it provides a gradual opening as it moves relative to its seat.

Preferably, as shown, the masses $M_1$ and $M_2$ are carried within a suitably shaped recess in the piston 11. As illustrated, the mass $M_1$ is provided with a bifurcated lever arm 34 which extends between the ends of the oppositely disposed valves $V_1$ and $V_2$ and is pivotally mounted upon a pin 46 in such manner that the valves $V_1$ and $V_2$ are actuated in response to the vertical movement of the sprung mass. A suitable vertically disposed coil spring 49 is provided for holding the mass $M_1$ in such position that the ends of the bifurcated arm 34 are balanced between the ends of the valves $V_1$ and $V_2$ when the sprung mass of the vehicle is vertically stationary. Under this condition the valve $V_1$ is actuated by means of gravity to its open position, and the valve $V_2$, while actuated by gravity to its closed position is easily biased upwardly to its full open position by the fluid pressure acting against the bottom of the said valve. Therefore, when the control masses $M_1$ and $M_2$ are in their balanced positions, the fluid is substantially free to flow through the fluid passages 20 and 21 and, consequently, the unsprung mass is substantially free to move relative to the sprung mass.

In order that the mass $M_2$ may function to control the operation of the valves $V_1$ and $V_2$ independently of the mass $M_1$, it is provided with an L-shaped arm or lever 35 that is disposed between the bifurcated arm 34 of the mass $M_1$. (See Fig. 2.)

The mass $M_2$ is pivotally supported on the pin 46 in such manner that the valves $V_1$ and $V_2$ are actuated in response to the horizontal oscillatory movements of the piston 11 or, in other words, to the relative movements of the sprung and unsprung masses.

In order to provide for maintaining the necessary amount of fluid in the chambers 17 and 18 at all times, a chamber or reservoir 42 is formed in the upper portion of the housing 10 above cam recess 14, which reservoir stores a reserve supply of fluid for the piston chambers 17 and 18. As illustrated, the reserve fluid is conducted from the reservoir by a duct 41 into the recesses of the piston 11 and thence through a ball check valve 38 into the chamber 17.

The reserve fluid from reservoir 42 thus flows by reason of gravity and atmospheric pressure through the ball check valve 38 into the chamber 17 to maintain the working chambers fully charged at all times. For the purpose of assembling the valves $V_1$ and $V_2$ within the piston, the valve seat members 36 and 37 are snugly pressed into suitable recesses, after the valves $V_1$ and $V_2$ are inserted.

Likewise, for the purpose of assembling the control masses $M_1$ and $M_2$, the right end of the piston is provided with a circular disc member 19 that is snugly pressed therein and which constitutes the greater part of the piston head. It is to be noted that a press fit is sufficient to prevent the valve seat members 36 and 37, and the circular disc member 19 from becoming disengaged since they are always subject to a fluid under pressure.

In order to mount the arm 16 within the housing 10, the top portion thereof is provided with a removable cover 13 secured thereto by any suitable means, such as screws 44. Also, a refilling screw plug 45 is provided in the top of the cover 13.

The operation of the shock absorber in response to the vertical movements of the sprung mass is as follows: Let it be assumed that the springs of the vehicle are compressed, as they will be after the vehicle passes over a raised portion of the road surface. Under this assumed condition, the springs of the vehicle will move the sprung mass upwardly, first with an increasing vertical velocity and then with a decreasing vertical velocity as the springs approach the end of their expansion, and then the sprung mass will move downwardly, first with an increasing vertical velocity and then with a decreasing vertical velocity as the springs approach the end of their second compression. This operation is graphically illustrated in Fig. 4.

The points where the increasing vertical velocity of the sprung mass changes to a decreasing vertical velocity will be designated as the balanced position of the sprung mass. (See points D, E and F of Fig. 4.) Likewise that part of the cycle in which the sprung mass is moving upwardly with an increasing vertical velocity will be designated as the first quarter cycle, that part in which the sprung mass is moving upwardly with a decreasing vertical velocity will be designated as the second quarter cycle, that part in which the sprung mass is moving downwardly with an increasing vertical velocity will be designated as the third quarter cycle, and that part in which the sprung mass is moving downwardly with a decreasing vertical velocity will be designated as the fourth quarter cycle. (See Fig. 4.)

Assume now that the springs have been compressed and are moving the sprung mass upwardly in the first quarter-cycle. During this period, since the sprung mass is moving upwardly with an increasing vertical velocity, the movement of the mass $M_1$ will lag behind the sprung mass and close the valve $V_1$. At the same time, it will be observed that the clockwise motion of arm 16 causes the piston 11 to move to the left to subject the fluid in the chamber 17 to a pressure determined by the position of valve $V_1$ with respect to its seat 24. The position of the valve is determined by the relative values of the hydrostatic force exerted by fluid in the piston chamber 17 against the valve and the inertia-force exerted by the mass $M_1$ in the opposite direction.

At the beginning of the first quarter-cycle, the inertia-force is large because the rate of change of the vertical velocity of the sprung mass is large and the valve $V_1$ is closed; but the hydrostatic force of the fluid in chamber 17, under the action of piston 11, immediately builds up to a value equal to the inertia force, thereby permitting some of the fluid to flow through the valve. Accordingly, the valve $V_1$ assumes such position relative to the valve seat 24 that the fluid in the piston chamber 17 is subjected to a pressure that is proportional to the rate of change of the increasing vertical velocity of the sprung mass. Therefore, the relative movements of the sprung mass and the unsprung mass of the vehicle during the first quarter-cycle are resisted by a force that is large at the beginning of the quarter-cycle and which gradually decreases to a small value as the sprung mass approaches the balanced position.

It is apparent that the greater the force tending to increase the vertical velocity of the sprung mass of the vehicle, the greater the resisting force of the shock absorber. The action of my device is such that it provides a resisting force that is a predetermined large fraction of the force tending to accelerate the sprung mass, thereby leaving only a predetermined small fraction to accelerate the sprung mass.

During the second quarter-cycle, since the sprung mass is moving upwardly with a decreasing vertical velocity, the movement of the mass $M_1$ will lead the movement of the sprung mass and thereby open the value $V_1$. Therefore, the relative movements of the sprung and the unsprung masses of the vehicle are resisted by a relatively small force, corresponding to the free-flow condition of the fluid through the opening of the valve $V_1$.

This free-flow condition may be changed to accommodate the various applications of the shock absorber. In other words, the free-flow condition may be such as to permit substantially free relative movement of the sprung and the unsprung masses of the vehicle, or it may be such as to provide a small force for resisting the relative movements of the sprung and the unsprung masses.

When the springs of the vehicle have reached the end of their expansion, the movement of the sprung mass is downward, in the third quarter-cycle. During this quarter-cycle, since the sprung mass is moving downwardly with an increasing vertical velocity, the movement of the mass $M_1$ will lag behind the movement of the sprung mass and close the valve $V_2$. At the same time, it will be observed that the piston 11 moves to the right to subject the fluid in chamber 18 to a pressure that is determined by the position of the valve $V_2$ relative to its seat 25. As explained before in relation to the operation of the shock absorber in the first quarter cycle, the valve $V_2$ assumes such position relative to its seat 25 that the fluid in the piston chamber 18 is subjected to a pressure that is proportional to the rate of change of the downward increasing vertical velocity of the sprung mass.

Figures 3, 4:
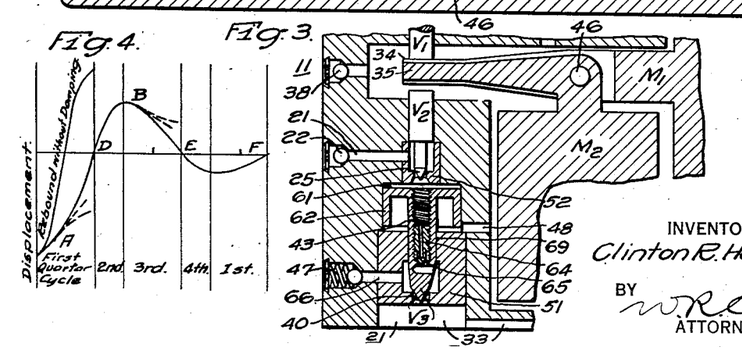
Fig. 3 is a fragmentary view, in vertical section, of the shock absorber embodying a multiplying valve which constitutes a modification of the valve arrangement shown in Fig. 1.
Fig. 4 is a curve that graphically shows the manner in which a shock absorber constructed in accordance with my invention functions.

Therefore, the relative movements of the sprung and the unsprung masses during the third quarter-cycle are resisted by a force that is large at the beginning of this quarter-cycle and which gradually decreases to a small force as the sprung mass approaches its balanced position, indicated by the point E in Fig. 4.

During the fourth quarter-cycle, since the sprung mass is moving downwardly with a decreasing vertical velocity, the movement of the unsprung mass $M_1$ will lead the movement of the sprung mass and open the valve $V_2$. Therefore, during this quarter-cycle, the sprung and the unsprung masses of the vehicles are resisted by a relatively small force that is determined by the free-flow condition of the fluid through the opening of the valve $V_2$. The free-flow condition of the valve $V_2$ may be made such as that previously described for the valve $V_1$, to accommodate the various applications of the shock absorber.

In order to have efficient operation of a shock absorber, it is necessary that the springs of the vehicle shall always be substantially free to expand when the wheels are passing over a depression in a road surface. In this connection, let it be assumed that the shock absorber is functioning to retard the upward movement of the sprung mass of the vehicle and that, during this time, the wheels encounter a depression in a road surface. Under this assumed condition, it will be observed that my shock absorber permits free movement of the springs in order to allow the wheels to fall into the depression. At the instant before the wheels encounter the depression, the valve $V_1$ is closed, since the sprung mass is moving upwardly with an increasing vertical velocity but, when the wheels fall into the depression, the upward increasing vertical velocity of the sprung mass changes either to an upward constant vertical velocity or to an upward decreasing vertical velocity (see point A, Fig. 4). In either of these cases, the movement of the mass $M_1$ will open the valve $V_1$, thus permitting the spring of the vehicle to be substantially free to expand when the wheels encounter a depression in the road surface.

Likewise, in order to have efficient operation of the shock absorber, it is necessary that the springs of the vehicle shall always be substantially free to move when the wheels are passing over a raised portion of a road surface. Assuming that the shock absorber is functioning to retard a downward movement of the sprung mass of the vehicle and that, during this time, the wheels encounter a raised portion of a road surface, the shock absorber will permit free movement of the springs in order to allow the wheels to pass over a raised portion without subjecting the sprung mass to a jar. At the instant before the wheels encounter the raised portion of the road surface, the valve $V_2$ is closed, since the sprung mass is moving downwardly with an increasing vertical velocity, but, when the wheels encounter a raised portion, the downward increasing vertical velocity of the sprung mass changes either to a downward constant vertical velocity or to a downward decreasing vertical velocity (see point B, Fig. 4). In either of these cases, the movement of the mass $M_1$ will open the valve $V_2$, thus permitting the springs of the vehicle to be substantially free to move when the wheels encounter a raised portion of the road surface.

Therefore, my shock absorber functions to permit substantially free movement of the springs of the vehicle when the wheels encounter either a depression or a raised portion in the road surface, although at the instant previous to the wheels encountering such irregularities in the road surface, the shock absorber may have been functioning to retard relative movement of the sprung and the unsprung masses.

From the foregoing description of the operation and from Fig. 4, it is evident that my shock absorber provides for materially lengthening the period of the free oscillations of the sprung mass as though an additional mass were added to the sprung mass during the first and third quarter-cycles. A mass gives rise to a resisting force proportional to the rate of change of its velocity. My shock absorber also provides a resisting force proportional to the rate of change of the vertical velocities of the sprung mass during the first and third quarter-cycles and, therefore, produces an effect during these periods similar to that which an additional mass would produce. However, there is this distinction, namely, that the shock absorber provides for lengthening the period by dissipating the stored energy of the springs as heat, whereas the additional mass provides for changing the period, not by the dissipation of energy, but by the transformation of the potential energy of the springs into kinetic energy. During the second and fourth quarter-cycles, the duration is substantially the same as it would be without any shock absorber, since the small resisting force is not proportional to the rate of change of the vertical velocities of the sprung mass.

Since the duration of the damping period of the sprung mass of a vehicle is much longer than what it normally would be without my shock absorber, the resonance frequency of the vertical movements of the sprung mass is much less. This means that the periodicity of the sprung mass is less likely to correspond to the undulations of the road surface, thereby preventing an increase in the amplitude of the vertical movements of the sprung mass caused by sympathetic vibrations.

The operation of the shock absorber which are responsive to the vertical movement of the unsprung mass of the vehicle will now be described. It will be observed, from Fig. 1 of the drawings, that the center of gravity of the mass $M_2$ is vertically below the pin 46 and, consequently, it is not responsive to the increasing or decreasing vertical velocities of the sprung mass. However, the mass $M_2$ is responsive to the increasing and decreasing vertical velocities of the unsprung mass, relative to the sprung mass, because the piston 11 moves proportionally to such relative movement. However, since the mass $M_1$ functions to keep the magnitude of the vertical displacements of the sprung mass of the vehicle to a minimum, the mass $M_2$ is substantially responsive to the absolute vertical velocity of the unsprung mass.

Even assuming, however, that the movements of the sprung mass of the vehicle are not kept small compared with those of the unsprung mass of the vehicle, the control mass $M_2$ would still respond principally to the movements of the unsprung mass, for the reason that the rates of change of velocity of the unsprung mass are always many times greater than the rates of change of the velocity of the sprung mass. Therefore, the control mass $M_2$ is substantially responsive to the absolute rates of change of velocity of the unsprung mass of the vehicle even though the control mass $M_1$ be not employed to resist the movements of the sprung mass of the vehicle. Generally stated, the function of that part of my shock absorbers controlled by the mass $M_1$ is to decrease the magnitude of the vertical movements of the body and thereby keep the magnitude during a condition of resonance of the body at a low value, and the function of that part of my shock absorber controlled by the mass $M_2$ is to decrease the magnitude of the vertical movements of the unsprung mass and thereby keep the magnitude during a condition of resonance of the unsprung mass at a low value.

Let it be assumed that the movement of the unsprung mass is vertically upward, as it will be when the wheels of the vehicle encounter an abrupt change in elevation of the road surface from a low level to a higher level. Under this assumed condition, the unsprung mass has an upward increasing vertical velocity until the instant slightly before the wheels tend to leave the road surface and then the upward increasing vertical velocity of the unsprung mass changes to an upward decreasing vertical velocity.

As will be readily understood, when the unsprung mass is moving upwardly, the movement of the piston 11 relative to its enclosing cylinder is to the right. During the period when the unsprung mass is moving upwardly with an increasing vertical velocity, the movement of the mass $M_2$ lags behind the movement of the piston 11 and opens the valve $V_2$. Thus, the fluid in the chamber 18 is permitted to flow into the chamber 17 through the fluid passage 21. In other words, the shock absorber does not retard the relative movements of the sprung and unsprung masses during the period when the unsprung mass is moving upwardly with an increasing velocity.

However, during the period when the unsprung mass is moving upwardly with a decreasing velocity, the movement of the mass $M_2$ leads the movement of the piston 11 and closes the valve $V_2$. Under this condition, since the ball check valve 23 prevents the fluid from flowing through the fluid passage 20, the only means of escape for the fluid in the chamber 18 is through the fluid passage 21 past the valve $V_2$. But, as explained hereinbefore, the mass $M_2$ functions to reduce the opening of the valve $V_2$, thereby offering a resistance to the flow of the fluid through the passage 21. This action is such as to absorb the kinetic energy of the unsprung mass. The rate of absorption is cumulative. That is, the more the movement of the piston 11 is retarded by the fluid pressure building up in the chamber 18, the more the mass $M_2$ tends to hold the valve $V_2$ closed. The mass $M_2$ continues to hold the valve $V_2$ closed until the kinetic energy of the unsprung mass is reduced to zero.

Therefore, under the present assumed condition, the shock absorber, at the instant slightly before the wheels begin to leave the road surface, functions to absorb the greater part of the kinetic energy of the upwardly moving unsprung mass. Therefore, it is evident that the small remaining part of the kinetic energy of the upwardly moving unsprung mass not absorbed by the shock absorber is insufficient to cause the wheels to leave the road surface as they would have done had the greater part of energy not been absorbed by the shock absorber.

Let it now be assumed that the vertical movement of the unsprung mass is downward, as it will be when the wheels encounter an abrupt change from a high level in the road surface to a lower level. Under this assumed condition, the unsprung mass has an increasing downward vertical velocity until the instant slightly after the tires strike the lower level of the road surface, and then the increasing downward vertical velocity of the unsprung mass changes to a decreasing downward vertical velocity. It will be observed that, when the unsprung mass is moving downwardly relative to the sprung mass, the movement of the piston 11 relative to its enclosing cylinder is to the left. During the period that the unsprung mass is moving downwardly with an increasing vertical velocity, the mass $M_2$ functions to open the valve $V_1$, which permits the fluid in the chamber 17 to flow into the chamber 18, through the fluid passage 20, and accordingly, the wheels are free to fall to the lower level of the road surface. However, at the instant slightly after the tires strike the lower level, the mass $M_2$ functions to close the valve $V_1$. This subjects the fluid in the chamber 17 to a pressure which reduces the velocity of the downwardly moving unsprung mass, thus absorbing the greater part of the kinetic energy of the unsprung mass. The rate of absorption is cumulative, as has been previously described. The mass $M_2$ continues to hold the valve $V_1$ closed until the kinetic energy of the unsprung mass is reduced to zero.

Therefore, under the last assumed condition, the shock absorber, at the instant slightly after the tires strike the road surface, absorbs the greater part of the kinetic energy of the downwardly moving unsprung mass and, consequently, the tires will not be compressed as much as they would have been compressed had the kinetic energy not been absorbed by the shock absorber. Therefore, it follows that the potential energy of the slightly compressed tires will not be sufficient to cause the wheels to leave the road surface.

Thus, generally stated, the mass $M_2$ causes the shock absorber to function to keep the wheels of the unsprung mass of the vehicle from leaving the road surface, thereby insuring good traction between the tires and the irregularities of a road surface.

It has been determined by tests that, by utilizing a multiplying valve in relationship with the valves $V_1$ and $V_2$, respectively, the shock absorber, and particularly the masses $M_1$ and $M_2$ therein, may be made smaller and lighter and still resist the relative movements of the sprung and unsprung masses with the same force. The multiplying valves are identical in structure, one of which is illustrated in Fig. 3 in conjunction with the valve V₂.

Figure 5:
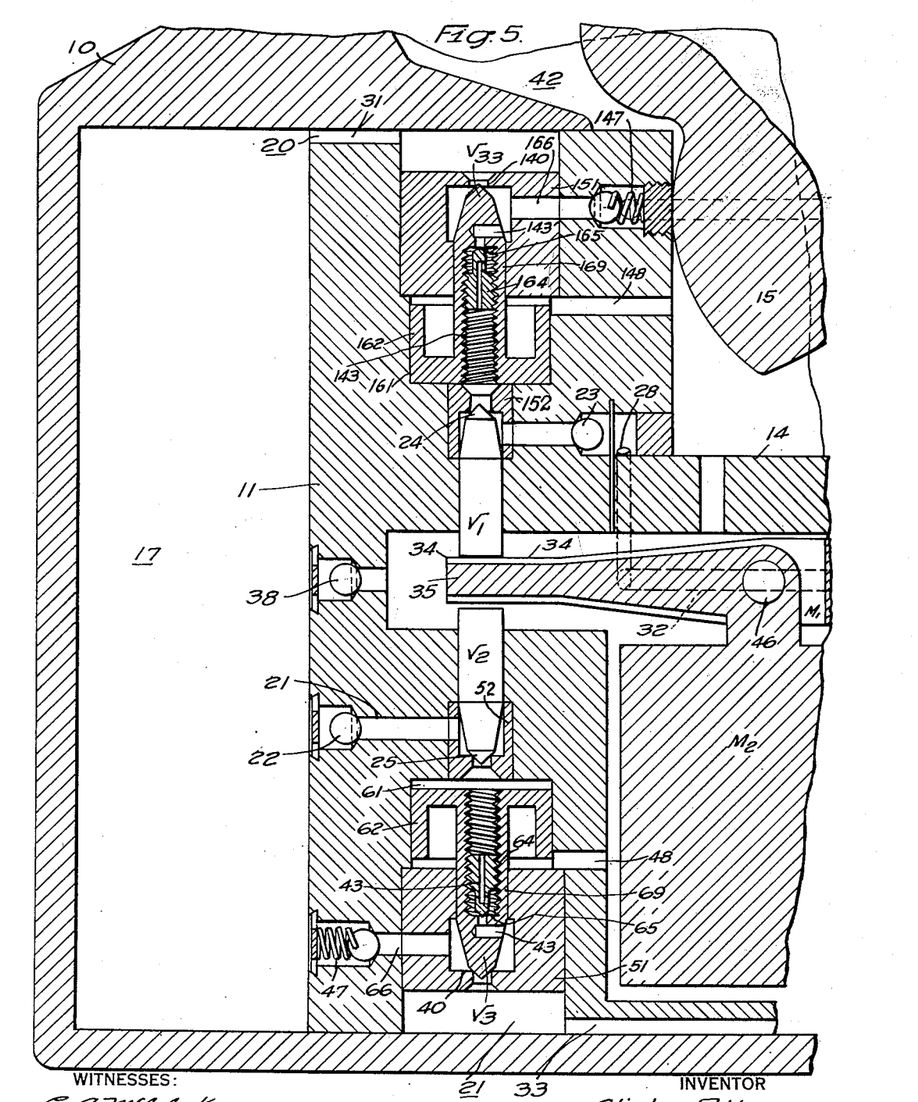
Fig. 5 is a fragmentary view, in vertical section, of the shock absorber embodying a plurality of multiplying valves shown in relation to the passages controlled thereby, and which constitutes a more detailed and enlarged showing of the modification illustrated in Fig. 3.

In Fig. 5 both the multiplying valves are shown in relation to the piston.

The low pressure valve V₂, the fluid passage 21, and the ball check valve 22 of Fig. 3 are the same as those of Fig. 1. However, the multiplying valve arrangement in Fig. 3 embodies, in addition to the valve arrangement shown in Fig. 1, a high pressure valve V₃ which is interposed in the fluid passage 21, a duct 66 extending at right angles to valve V₃, and a spring ball check valve 47 therein. It is to be understood that the combination of the valve V₂, the valve V₃ and the associated ducts and ball check valves, is to be designated as a multiplying valve.

The high pressure valve V₃ is adapted to function in tandem to the valve V₂ and is disposed to seat in valve seat 40 which is formed in the valve seat member 51. For the purpose of assembling the multiplying valve seat members 51 and 52 are snugly pressed into suitable recesses provided therefor, after the valves V₂ and V₃ are positioned. The upper end of the valve V₃ is formed into a piston 62 which is mounted within a cylinder 61 in the piston 11. The lower end of the cylinder 61 is in communication with the recesses formed in the piston 11 by means of a duct 48. This duct is adapted to take care of the fluid that may leak past the piston 62 from the top part of the cylinder 61 and the fluid that may leak past the valve stem 69 of the valve V₃ from the duct 66, which leads off from the valve seat 40 and contains a pressure relief valve 47 in the form of a spring ball check valve. The upper part of the piston 62 is in communication with the duct 66 through a duct 43 in the center of the stem 69 of the valve V₃. The upper end of the duct 43 is threaded to receive an adjusting screw 64, having a needle valve formed on the end thereof which is disposed closely to the valve seat 65 formed in the duct 43 in order to constitute a restriction.

The high pressure valve V₃₃ is adapted to function in tandem to the valve V₁, and is disposed to seat in valve seat 140 which is formed in the valve seat member 151. For the purpose of assembling the multiplying valve seat, members 151 and 152 are snugly pressed into suitable recesses provided therefor, after the respective valves V₁ and V₃₃ are positioned. The lower end of the valve V₃₃ is formed into a piston 162 which is mounted within a cylinder 161 in the piston 11. The upper end of the cylinder 161 is in communication with the recesses formed in the piston 11 by means of a duct 148. This duct is adapted to take care of the fluid that may leak past the piston 162 from the lower part of the cylinder 161 and the fluid that may leak past the valve stem 169 of the valve V₃₃ from the duct 166 which leads off from the valve seat 140 and contains a pressure relief valve 147 in the form of a spring ball check valve. The lower part of the piston 162 is in communication with the duct 166 through a duct 143 in the center of the stem 169 of the valve V₃₃. The lower end of the duct 143 is threaded to receive an adjusting screw 164, having a needle valve formed on the end thereof which is disposed closely to the valve seat 165 formed in the duct 143 in order to constitute a restriction.

It is to be borne in mind that by utilizing the multiplying valves, the general performance of the shock absorber is not changed and that the description of the operation hereinbefore relating to the shock absorber applies equally well to the performance of the shock absorber as when the multiplying valves are utilized. In other words, the valves V₁ and V₂, which are a part of the multiplying valves, are actuated by the control masses M₁ and M₂ in the same manner as they are when the multiplying valves are not employed.

In order to describe the functioning of the multiplying valves with respect to the vertical movements of the sprung and the unsprung masses of the vehicle, it may be assumed first that the shock absorber is functioning to resist the downward movement of the sprung mass of the vehicle during the third quarter cycle (see Fig. 4). Under this condition, the piston 11 is moving to the right and, by reason of the downward increasing vertical velocity of the sprung mass of the vehicle, the bifurcated ends 34 of the control mass M₁ are exerting a downward force to close the pilot valve V₂. Therefore, as the piston 11 moves to the right, the fluid tends to flow from the chamber 18 of high pressure through the fluid groove 33, the multiplying valve and thence to the chamber 17 of low pressure. In the first instance, the fluid pressure in the fluid groove 33 rises to such a value as to lift the valve V₃ from its seat 40. This allows the fluid to flow through the opening of the valve V₃ and into the enlarged portion of the duct 66 that surrounds the lower part of the stem of the valve V₃. From the enlarged portion of the duct 66, the fluid flows through the needle valve restriction in the duct 43 of the stem of the valve V₃ and thence into the fluid chamber above the piston 62.

Because of the large resultant fluid pressure drop effected as the fluid flows through the opening of the valve V₃ and through the needle valve restriction of the duct 43, the fluid pressure above the piston 62 is considerably lower than the fluid pressure in the fluid groove 33. Since the valve V₂ is at this stage very nearly closed the fluid that flows through the needle valve restriction of the duct 43 soon fills the fluid chamber above the piston 62. Just as soon as the fluid fills the chamber above the piston 62, even though the fluid pressure in the chamber above the piston 62 is considerably lower than the fluid pressure in the fluid groove 33, the valve V₃ is hydrostatically biased downwardly to nearly close the opening of the valve V₃, because the total force exerted by the relatively low pressure fluid acting downwardly upon the relatively large area of the piston 62, is greater than the total force exerted by the high pressure fluid acting upwardly upon the lower part of the stem of the valve V₃. Therefore, the action of my multiplying valve is such as to effect a multiplication, whereby a small downward force applied in the direction to close the pilot valve V₂ by the control masses M₁ is able to control a fluid of relatively high pressure acting upon the lower part of the valve V₃. Therefore, when the pilot valve V₂ is nearly closed, the valve V₃ is likewise nearly closed to corresponding position.

At the beginning of the downward movement of the sprung mass of the vehicle during the third quarter cycle, the inertia effect of the control mass M₁ is a maximum. This means that, under this condition, the valve V₃ is hydrostatically biased downwardly by a relatively large force, with the result that very little, or substantially no, fluid flows past the valve V₃ into the enlarged portion of the duct 66.

When the valve V₃ is hydrostatically biased downwardly with a relatively large force, as it is when the inertia effect of the control mass $M_1$ is a maximum, the drop in fluid pressure effected by the small amount of fluid flowing past the valve $V_3$ is very great, with the result that the fluid pressure in the duct 66 is relatively low. In accordance with my invention, the strength of the spring of the pressure relief valve 47 is of such high value that, when the valve $V_3$ is biased downwardly with a relatively large force, the fluid pressure in the duct 66 is not sufficient to overcome the opposing biasing force of the spring of the ball check valve 47. Therefore, under this condition, the only means of escape for the small amount of fluid that flows past the valve $V_3$, is through the needle valve restriction of the duct 43, the pilot valve $V_2$ and the ball check valve 22 into the chamber 17 of low pressure.

However, as the downward movement of the sprung mass of the vehicle approaches the end of the third quarter-cycle, the inertia effect of the control mass $M_1$ gradually decreases and becomes zero at the point where the downward increasing vertical velocity changes to a downward decreasing vertical velocity. (See point E of Fig. 4.) When the inertia effect of the control mass $M_1$ is zero, the bifurcated ends 34 of the control mass $M_1$ are maintained in a balanced position between the pilot valves $V_1$ and $V_2$. This means that the fluid pressure acting upwardly on the lower part of the pilot valve $V_2$ raises the said valve, and thereby permits fluid in the chamber above the piston 62 to flow freely past the pilot valve $V_2$ and the ball check valve 22 into the chamber 17 of low pressure. The escapement of the fluid from the chamber above the piston 62 prevents the fluid pressure in the chamber above the piston 62 from building up, as it did when the pilot valve $V_2$ was closed. Consequently, in the open position of the pilot valve $V_2$, because of the large pressure drop effected as the fluid flows through the restricted duct 43 of the valve stem of the valve $V_3$ and because of the small pressure drop effected as a fluid flows through the valve $V_2$, the fluid pressure in the chamber above the piston 62 is relatively low. Therefore, if the ratio of the pressure drop effected by the fluid flowing through the restricted duct 43 to the pressure drop effected by the fluid flowing through the valve $V_2$ is sufficiently high, as it will be when the valve $V_2$ is open, the total force exerted by the low pressure fluid acting downwardly upon the area of the piston 62 will be less than the total force exerted by the high pressure fluid acting upwardly upon the lower part of the stem of the valve $V_3$. Accordingly, the valve $V_3$ is hydrostatically biased upwardly to its open position.

In the open position of the valve $V_3$, the pressure drop effected by the fluid flowing through the valve $V_3$ is relatively small and, consequently, the pressure of the fluid in the duct 66 is almost as great as the pressure of the fluid in the fluid groove 33. Therefore, under the open position of the valve $V_3$, the fluid pressure in the duct 66 is sufficiently high to overcome the spring of the pressure relief valve 47, with the result that the fluid escapes quickly into the chamber 17 of low pressure. It has been determined by tests that the illustrated multiplying valve, is operative without the utilization of the pressure relief valve 47, but in this case all of the fluid must flow through the restricted duct 43 and the pilot valve $V_2$, with the result that the fluid pressure during the free flow condition, that is when the valve $V_2$ is open, is not so small as it is when a pressure relief valve 47 is employed.

The operation of the multiplying valve in connection with the control mass $M_2$ is the same as the detailed operation just described in connection with the control mass $M_1$. As hereinbefore described, the control mass $M_2$ is responsive to the reciprocatory movements of the piston 11 which is, in turn, responsive to the relative movements of the sprung and unsprung mass of the vehicle. The action of the control mass $M_2$, in combination with the multiplying valve shown in Fig. 3, is such that the shock absorber provides for resisting the relative movement of the sprung and unsprung masses of the vehicle during the periods when the unsprung mass is moving upwardly with a decreasing velocity. This means that under this condition the piston 11 is moving to the right and that the movement of the control mass $M_2$ is leading the movement of the piston 11, thus causing the arm 36 to move downwardly and close the valve $V_2$. Therefore, as the piston 11 moves to the right the fluid tends to flow from the chamber 18 and the fluid groove 33 of high pressure through the multiplying valve, in a manner hereinbefore described in connection with the mass $M_1$, and thence to the chamber 17 of the low pressure.

From the foregoing, it is noted that, when the pilot valve $V_2$ is closed, the hydrostatic force of the fluid biases the valve $V_3$ downwardly to its closed position, and the multiplication effect of the multiplying valve is, accordingly, a relatively large positive value; and that, when the pilot valve $V_2$ is in its open position, the hydrostatic force of the fluid biases the valve $V_3$ upwardly to its open position, and the multiplication effect is, accordingly, a relatively small negative value. Therefore, as the pilot valve $V_2$ assumes the various graduated positions from its full closed position to its full open position, the multiplication effect of the multiplying valve varies between a relatively large positive value to a relatively small negative value.

The rate at which the multiplication varies, in accordance with the corresponding position of the pilot valve $V_2$, may be best understood by designating the various parts of the multiplying valve and the corresponding fluid pressures in the various parts by symbols and assigning arbitrary values to the said symbols:

Let:

(1) $P_{33}$ = the pressure of the fluid in the fluid duct 33.
(2) $P_{66}$ = the pressure of the fluid in the duct 66.
(3) $P_{62}$ = the pressure in the chamber above the piston 62.
(4) $A_{33}$ = the area of that portion of the lower part of the valve $V_3$ that is affected by the fluid pressure in the fluid groove 33.
(5) $A_{66}$ = the area of that portion of the lower part of the valve $V_3$ that is affected by the fluid pressure in the duct 66.
(6) $A_{62}$ = the area of the piston 62.
(7) $R_3$ = the resistance encountered by the fluid flowing through the valve $V_3$.
(8) $R_{43}$ = the resistance encountered by the fluid flowing through the restricted duct 43.
(9) $R_2$ = the resistance encountered by the fluid flowing through the valve $V_2$.
(10) $F$ = the rate of flow of the fluid (assuming viscous flow).

Therefore, the hydrostatic force acting on the high pressure valve $V_3$ may be expressed by the equation:

$$P_{33}A_{33} = P_{62}A_{62} - P_{66}A_{66} \quad (1)$$

But:

$$P_{62} = FR_2, \text{ and} \quad (2)$$
$$P_{66} = F(R_2 + R_{43}) \quad (3)$$

Substituting (2) in (3), and (3) becomes:

$$P_{66} = P_{62}\left(\frac{R_2 + R_{43}}{R_2}\right) \quad (4)$$

Finally, by substituting (4) in (1), we obtain the expression for the multiplication ratio of the multiplying valve.

$$\frac{P_{33}}{P_{62}}, \text{ (the multiplication ratio)} =$$

$$\left(\frac{A_{62}}{A_{33}}\right) - \left(\frac{A_{66}}{A_{33}}\right) \times \left(\frac{R_2 + R_{43}}{R_2}\right) \quad (5)$$

Assume that:

$$\left(\frac{A_{62}}{A_{33}}\right) = 64$$

and $$\left(\frac{A_{66}}{A_{33}}\right) = 8$$

then from the foregoing equation (5) we note that the multiplication ratio, $$\frac{P_{33}}{P_{62}}$$

is determined by the ratio $$\frac{R_{43}}{R_2}$$

that is, by the opening of the valve $V_2$, since the value of $R_{43}$, when once adjusted, is constant.

Accordingly, we observe that, when the ratio $$\frac{R_{43}}{R_2}$$

equals zero (being the condition when the valve $V_2$ is perfectly closed, thus making the value $R_2$=infinity) the multiplication ratio, $$\frac{P_{33}}{P_{62}}$$

equals 56. By assuming that the ratio $$\frac{R_{43}}{R_2}$$

equals 7, then the multiplication ratio $$\frac{P_{33}}{P_{62}}$$

is zero. By further assuming that the ratio $$\frac{P_{43}}{R_2}$$

equals 8, then the multiplication ratio $$\frac{P_{33}}{P_{62}}$$

equals negative 8, which means that the resultant fluid pressure is acting upwardly to open the valve $V_3$. In this embodiment of my multiplying valve, although the size of the valve $V_2$ may be of any suitable dimension and although the adjusting screw 64 that varies the needle valve restriction of the duct 43 may be adjusted to any value with reference to the opening of the valve $V_2$, the adjustment and proportions are such that, when the valve $V_2$ is in its full open position, the ratio, $$\frac{R_{43}}{R_2}$$

is of such a value that no multiplication at all takes place or a multiplication of a relatively small negative value is provided. In either case valve $V_3$ will be wide open.

Also, the action of the pressure relief valve 47 is such that, when the valve $V_3$ is hydrostatically lifted to its full open position, the spring of the pressure relief valve 47 is insufficient to resist the high fluid pressure in the duct 66, with the result that the fluid immediately escapes into the chamber 17 of low pressure, but is resisted in its flow by the susbtantially constant force of the spring for valve 47. In other words, no flow at all takes place unless the pressure in displacement chamber 18 is in excess of a relatively low substantially predetermined pressure.

As hereinbefore stated when valve $V_2$ is completely closed, the multiplication ratio is a fixed maximum, as 56. Under such conditions $R_2$ approaches infinity as a limit.

Equation (4) thus becomes $$P_{66} = P_{62}\left(\frac{R_2}{R_2} + \frac{R_{43}}{R_2}\right) = P_{62}(1+0) = P_{62} \quad (6)$$

Similarly Equation (5), when substituting $P_{66}$ for $P_{62}$, becomes $$\frac{P_{33}}{P_{66}} = \frac{A_{62}}{A_{33}} - \frac{A_{66}}{A_{33}}\left(\frac{R_2}{R_2} - \frac{R_{43}}{R_2}\right) \quad (7)$$

$$P_{33} = P_{66}\left(\frac{A_{62} - A_{66}}{A_{33}}\right), \quad (8)$$

which is the maximum pressure that can occur in passage 33 and thus the compression chamber 18. In other words, a relatively high substantially predetermined pressure in displacement chamber 18 must be attained before fluid may flow from the displacement chamber through the fluid discharge means provided.

A second multiplying valve, shown in Fig. 5, is adapted to operate in conjunction with the pilot valve $V_1$, and is identical in structure and in operation to the multiplying valve shown in Fig. 3. This second multiplying valve operates to variably resist the flow of the fluid from the chamber 17 of high pressure to the chamber 18 of low pressure.

As will be noted, the control mass $M_1$ operates to close the pilot valve $V_1$, and thus operates the second multiplying valve during the periods when the sprung mass of the vehicle is moving upwardly with an increased velocity, being the first quarter-cycle (see Fig. 4). The control mass $M_2$ operates to close the pilot valve $V_1$ and thus operates the second multiplying valve during the periods when the unsprung mass is moving downwardly with a decreasing velocity. Therefore, it is readily understood that by utilizing the multiplying valves the control masses $M_1$ and $M_2$ may be made considerably lighter than those required when no multiplying valves are utilized, because the pilot valves $V_1$ and $V_2$ need to operate against a relatively low fluid pressure instead of the high pressure fluid existing in the fluid grooves 32 and 33.

I have thus described a shock absorber which provides a force for resisting the relative movements of the sprung and unsprung masses of a vehicle when the vertical velocity of the sprung mass is increasing and when the vertical velocity of the unsprung mass is decreasing for giving a smooth and easy movement to the sprung mass and for insuring good traction between the wheels and a road surface.

While the illustrated examples constitute practical embodiments of my invention, I do not limit myself strictly to the exact details herein illustrated, since various modifications thereof may be made without departing from the spirit of the invention as defined in the appended claims.

I claim as my invention:

1. A shock absorber for vehicles of the type having a sprung and an unsprung mass comprising, in combination, a cylinder and a two-way piston actuated by the relative movements of the sprung and the unsprung masses and having a fluid passage for permitting the movement of a fluid through said piston upon a relative movement of said masses, and an inertia-controlled poppet valve for resisting the movement of said fluid in said fluid passage.

2. A shock absorber for absorbing energy comprising, in combination, a cylinder and a two-way piston actuated by the relative movements of two masses for subjecting a fluid to pressure, means including a poppet valve for permitting the movement of the fluid through said piston upon a relative movement of the two masses and a control-mass for actuating said poppet valve.

3. A shock absorber for absorbing energy comprising, in combination, a cylinder and a two-way piston actuated by the relative movements of two masses for subjecting a fluid to pressure, means including a valve for permitting the movement of the fluid through said piston upon a relative movement of the two masses, and a control-mass for actuating the valve, said valve being designed so that the effective opening of said valve is influenced by the hydrostatic force exerted by the fluid against said valve.

4. A shock absorber for absorbing energy comprising, in combination, a cylinder and a two-way piston actuated by the relative movements of two masses for subjecting a fluid to pressure and having a fluid passage for permitting the movement of a fluid through said piston upon a relative movement of said masses, a hydrostatically unbalanced valve for controlling the movement of the fluid in said passage, and a control mass for actuating the valve, whereby the effective opening of said valve is influenced by the hydrostatic force exerted by the fluid against said valve.

5. A shock absorber for vehicles of the type having a sprung and an unsprung mass comprising, in combination, a cylinder and a two-way piston actuated by the relative movements of the sprung and the unsprung masses for subjecting a fluid to pressure, means for varying the pressure during periods of increasing vertical velocities of the sprung mass substantially in accordance with the rate of change of the vertical velocities of the sprung mass, and means for maintaining a small pressure during periods of decreasing vertical velocities of the sprung mass.

6. A shock absorber for vehicles of the type having a sprung and an upsprung mass comprising, in combination, a cylinder and a two-way piston actuated by the relative movements of the said masses for subjecting a fluid to pressure, means including a low-pressure valve and a high pressure valve controlled by said low-pressure valve for permitting the movements of said fluid through said piston upon a relative movement of the said masses, and a control mass for actuating said low-pressure valve.

7. A shock absorber for vehicles of the type having a sprung and an unsprung mass comprising, in combination, a cylinder and a piston actuated by the relative movements of the said masses for subjecting a fluid to pressure, and means including a multiplying valve and a control-mass for determining the degree of pressure to which the fluid is subjected.

8. A shock absorber for vehicles comprising, in combination, two relatively-movable elements connected, respectively, to the sprung and unsprung masses of a vehicle, one of said elements having a fluid passage extending therethrough for permitting the movement of a fluid upon the relative movement of said masses, and an inertia-controlled multiplying valve responsive to the increasing vertical velocity of the sprung mass for so resisting the movement of said fluid in said passage that the fluid is subjected to a pressure substantially proportional to the rate of change of said vertical velocity, said inertia-controlled multiplying valve being also responsive to the decreasing vertical velocity of the sprung mass for permitting substantially free movement of said fluid in said passage.

9. A shock absorber for vehicles comprising, in combination, two relatively-movable elements connected, respectively, to the sprung and unsprung masses of the vehicle, one of said elements having a plurality of fluid passages extending therethrough for permitting the movement of a fluid upon the relative movement of said masses, and inertia-controlled multiplying valves responsive to the increasing vertical velocity of the sprung mass for so resisting the movement of said fluid in said passages that the fluid is subjected to a pressure substantially in proportion to the rate of change of said vertical velocity, said inertia-controlled multiplying valves being also responsive to the decreasing vertical velocity of the sprung mass for permitting substantially free movement of said fluid in said passage.

10. A shock absorber for vehicles comprising, in combination, two relatively-movable elements connected, respectively, to the sprung and unsprung masses of the vehicle, one of said elements having a plurality of fluid passages extending therethrough for permitting the movement of a fluid upon the relative movement of said masses, and inertia-controlled multiplying valves responsive to the increasing vertical velocity of the sprung mass for so resisting the movement of said fluid in said passages that said fluid is subjected to a pressure which decreases from a large value to a small value as the rate of change of said vertical velocity decreases, said inertia-controlled multiplying valves being also responsive to the decreasing vertical velocity of the sprung mass for so resisting the movement of said fluid in said passages that said fluid is subjected to a pressure substantially equal to said small value.

11. A multiplying valve comprising, in combination, a low-pressure valve, a high-pressure valve, and means for controlling the operation of the high-pressure valve by the opening the closing of the low-pressure valve.

12. A multiplying valve comprising, in combination, a low-pressure valve, a high-pressure valve controlled by the low-pressure valve for multiplying the force which closes the low-pressure valve to a large value when the low-pressure valve is closed, a pressure-relief valve, and means for rendering the multiplication ineffective and for causing said pressure-relief valve to function when said low-pressure valve is open.

13. A multiplying valve comprising, in combination, a low-pressure valve, a high-pressure valve controlled by the low-pressure valve, interconnecting conduit means for providing communication between said valves, said conduit means having a restricted fluid passage, and means for adjustably varying the opening of the restricted fluid passage.

14. A multiplying valve comprising, in combination, a low-pressure valve, a high-pressure valve controlled by the low-pressure valve, and conduit means having a restricted fluid passage for providing intercommunication between said valves.

15. A multiplying valve comprising, in combination, a low-pressure valve, a high-pressure valve controlled by the low-pressure valve, conduit means having a restricted fluid passage for providing intercommunication between said valves and a pressure relief valve communicating with the high-pressure valve.

16. A multiplying valve comprising, in combination, a high-pressure valve, a piston, interconnecting means between the high-pressure valve and the piston, a cylinder for said piston, said high-pressure valve and said cylinder being interconnected by a restricted fluid passage in said interconnecting means, a low-pressure valve communicating with the said cylinder, and a pressure relief valve communicating with the high-pressure valve.

17. A multiplying valve comprising, in combination, a high-pressure valve, a piston connected to the high-pressure valve, a cylinder for said piston, said high-pressure valve having a restricted fluid passage leading to the cylinder, means for varying the opening of the restricted fluid passage, a low-pressure valve communicating with the said cylinder, and a pressure-relief valve communicating with the high-pressure valve.

18. A multiplying valve comprising, in combination, a high-pressure valve, a piston connected to the high-pressure valve, a cylinder for said piston, said high-pressure valve having a restricted fluid passage leading to the cylinder, a low-pressure valve communicating with the said cylinder, and a pressure relief valve communicating with the high-pressure valve.

19. In a vehicle having a sprung and an unsprung mass, a shock absorber which functions to improve the traction between the unsprung mass and a road surface comprising, in combination, two relatively movable elements which coact to provide a resisting force, and control means associated with the relatively movable elements for controlling the magnitude of the resisting force, said control means being influenced both by the decreasing vertical velocities of the unsprung mass relative to the sprung mass, and by the force between said coacting elements.

20. In a vehicle having a sprung and an unsprung mass, a shock absorber which functions to improve the traction between the unsprung mass and a road surface comprising, in combination, a fluid chamber of variable volume, means through which fluid is admitted into said chamber, and an inertia-controlled valve through which the fluid is expelled from said chamber, said valve being responsive to the decreasing vertical velocities of the unsprung mass relative to the sprung mass and to the fluid pressure in the fluid chamber.

21. In a vehicle having a sprung and an unsprung mass, a shock absorber which functions to improve the traction between the unsprung mass and a road surface comprising, in combination, a fluid chamber of variable volume, means through which fluid is admitted into said chamber, and an inertia-controlled multiplying valve through which the fluid is expelled from said chamber, said valve being responsive to the decreasing vertical velocities of the unsprung mass relative to the sprung mass and to the fluid pressure in the fluid chamber.

22. A shock absorber comprising, in combination, a fluid chamber and a piston for subjecting a fluid to pressure, means through which fluid is admitted into said chamber, and an inertia-controlled valve through which the fluid is expelled from said chamber, said valve being responsive to both the reciprocatory movements of the piston, and the fluid pressure in the fluid chamber.

23. A shock absorber comprising, in combination, a cylinder and a two-way piston for subjecting a fluid to pressure, said piston having a plurality of fluid passages through which the fluid may flow upon the reciprocating movements of the piston, a hydrostatically unbalanced valve associated with each fluid passage for variably resisting the flow of the fluid through the fluid passages, and an inertia control-mass responsive to the reciprocatory movements of the piston for operating the said valve.

24. A shock absorber comprising, in combination, a cylinder and a two-way piston for subjecting a fluid to pressure, said piston having a plurality of fluid passages through which the fluid may flow upon the reciprocatory movements of the piston, a multiplying-valve associated with each fluid passage for variably resisting the flow of the fluid through the fluid passages, and an inertia control-mass responsive to the reciprocatory movements of the piston for operating the said multiplying valve.

25. In a vehicle having a sprung and an unsprung mass, a shock absorber which functions to improve the traction between the unsprung mass and a road surface comprising, in combination, means for resisting the relative movements of the sprung and unsprung masses of the vehicle, control means for causing the resisting means to be effective during periods of decreasing vertical velocities of the unsprung mass, and means for causing the resisting means to be ineffective during periods of increasing vertical velocities of the unsprung mass.

26. In a vehicle having a sprung and an unsprung mass, a shock absorber which functions to give a smooth and easy movement to the sprung mass of the vehicle and to improve the traction between the unsprung mass and a road surface comprising, in combination, means for resisting the relative movements of the sprung and unsprung masses of the vehicle, control means for causing the resisting means to be effective both during the periods of increasing vertical velocities of the sprung mass and during the periods of decreasing vertical velocities of the unsprung mass, and means for causing the resisting means to be ineffective both during the periods of decreasing vertical velocities of the sprung mass and during the periods of increasing vertical velocities of the unsprung mass.

27. In a vehicle having a sprung and an unsprung mass, a shock absorber which functions to give a smooth and easy movement to the sprung mass of the vehicle and to improve the traction between the unsprung mass and a road surface comprising, in combination, a fluid chamber of variable volume, means through which the fluid is admitted into said fluid chamber, a valve through which the fluid is expelled from said chamber, a control-mass for actuating said valve, said control mass being responsive to the increasing vertical velocities of the sprung mass to close said valve, and responsive to the decreasing vertical velocities of the sprung mass to open said valve, a second control-mass for actuating said valve, said second control-mass being responsive to the decreasing vertical velocities of the unsprung mass to close said valve and responsive to the increasing vertical velocities of the unsprung mass to open said valve.

28. In a vehicle having a sprung and an unsprung mass, a shock absorber which functions to give a smooth and easy movement to the sprung mass of the vehicle and to improve the traction between the unsprung mass and a road surface comprising, in combination, a cylinder and a two-way piston actuated by the relative movements of the two masses of the vehicle for subjecting a fluid to pressure, said piston having a plurality of fluid passages through which the fluid may flow upon the reciprocatory movements of the piston, a hydrostatically unbalanced valve associated with each fluid passage for variably resisting the flow of the fluid through the fluid passages, a control-mass responsive to the movements of the sprung mass for operating the said valve, and a second control-mass responsive to the relative movements of the sprung and unsprung masses of the vehicle for also operating the said valve.

29. In a vehicle having a sprung and an unsprung mass, a shock absorber which functions to give a smooth and easy movement to the sprung mass of the vehicle and to improve the traction between the unsprung mass and a road surface comprising, in combination, a cylinder and a two-way piston actuated by the relative movements of the two masses of the vehicle for subjecting a fluid to pressure, said piston having a plurality of fluid passages through which the fluid may flow upon the reciprocatory movements of the piston, a multiplying valve associated with each fluid passage for variably resisting the flow of the fluid through the fluid passages, a control-mass responsive to the movements of the sprung mass for operating the said multiplying valve, and a second control-mass responsive to the relative movements of the sprung and unsprung masses of the vehicle for also operating the said multiplying valve.

30. A shock absorber comprising, in combination, two relatively movable elements which coact to provide a resisting force, control means for controlling the magnitude of the resisting force, and two control-masses for governing the control means.

31. A shock absorber comprising in combination, a fluid cylinder, a piston having a fluid passage through which the fluid passes upon the reciprocatory movement of the piston, a valve for controlling the flow of the fluid, and two control-masses for controlling the said valve.

32. A shock absorber comprising, in combination, a fluid chamber of variable volume, means through which fluid is admitted into said chamber, a valve through which fluid is expelled from said chamber, and two control-masses for governing the valve.

33. A hydraulic shock absorber comprising, in combination, a cylinder, a two-way piston slidably mounted within said cylinder, said piston having a fluid passage through which the fluid flows upon the reciprocatory movements of said piston, a hydrostatically unbalanced valve associated with the fluid passage for variably resisting the flow of the fluid through the fluid passage, and an inertia control-mass for operating the said valve.

34. A shock absorber for vehicles which functions to improve the traction between the wheels and a road bed surface comprising, in combination, two relatively movable elements which coact to provide a resisting force and control means associated with the relatively movable elements for determining the magnitude of the resisting force below a fixed maximum force.

35. In a vehicle having a sprung and an unsprung mass, a shock absorber which functions to improve the traction between the unsprung mass and a road surface comprising, in combination, two relatively movable elements which coact to provide a resisting force, and inertia control means associated with the relatively movable elements whereby the magnitude of the resisting force is maintained below a predetermined maximum, said control mass being influenced both by the decreasing vertical velocities of the unsprung mass relative to the sprung mass, and by the force between said coacting elements.

36. In a vehicle having a sprung and an unsprung mass, a shock absorber which functions to improve the traction between the unsprung mass and a road surface comprising, in combination, a fluid chamber of variable volume, means through which the fluid is admitted into said chamber, and an inertia controlled valve through which the fluid is expelled from said chamber, an auxiliary valve biased to a given closing position by a predetermined force, said valve and auxiliary valve being disposed to cooperate so that the liquid passing said first-named valve is a function of decreasing vertical velocity of the unsprung mass relative to the sprung mass and to the fluid pressure in the fluid chamber when below a predetermined value.

37. In a vehicle having a sprung and an unsprung mass, a shock absorber which functions to improve the traction between the unsprung mass and a road surface comprising, in combination, a fluid chamber of variable volume, means through which fluid is admitted into said chamber, and an inertia controlled multiplying valve through which the fluid is expelled from said chamber, said valve being responsive to the decreasing vertical velocity of the unsprung mass relative to the sprung mass and to the fluid pressure in the fluid chamber below a predetermined maximum.

38. A shock absorber comprising, in combination, a fluid chamber and a piston for subjecting a fluid to pressure, means through which fluid is admitted into said chamber, and an inertia controlled valve through which the fluid is expelled from said chamber, said valve being responsive to both the reciprocatory movements of the piston, and the fluid pressure in the fluid chamber below a predetermined maximum pressure.

39. A shock absorber for vehicles of the type having a sprung and an unsprung mass comprising, in combination, a cylinder, a fluid supply reservoir, means for admitting fluid to the cylinder from said reservoir, a piston actuated by the relative movements of the said masses for subjecting the fluid at the end of the cylinder to pressure, means including a control valve and a high-pressure responsive valve controlled by said control valve for controlling the expulsion of said fluid from the high pressure end of the cylinder, and a control mass for actuating said control valve.

40. A shock absorber for vehicles of the type having a sprung and an unsprung mass comprising, in combination, a cylinder closed at both ends and containing a fluid, a two-way piston, actuated by the relative movement of said masses, in the cylinder and thus forming compression chambers in the cylinder at both ends of the piston, a fluid supply chamber, means for admitting fluid to the compression chambers from said supply chamber, fluid-flow control means for permitting movement of fluid from one compression chamber to the other upon movement of the piston, said fluid-flow control means including a control valve, a high-pressure responsive valve controlled by said control valve, and a control mass for actuating said control valve.

41. A shock absorber for vehicles of the type having a sprung and an unsprung mass comprising, in combination, a cylinder closed at both ends and containing a fluid, a two-way piston, actuated by the relative movement of said masses, in the cylinder and thus forming compression chambers in the cylinder at each end of the piston, a fluid supply reservoir, means for admitting fluid from the reservoir to the compression chambers, and flow control means for transferring fluid from one compression chamber to the other upon movement of said piston in said cylinder, said flow control means including a control valve and a high-pressure responsive valve controlled by said control valve and a weight actuated by the oscillations of said cylinder to control said control valve.

42. An hydraulic shock absorber having two fluid compression chambers and means for circulating fluid between said chambers; means adapted to control said fluid circulation; means for diverting a flow of fluid from the fluid circulating between said chambers; means actuated proportional to accelerative movements of the shock absorber for restricting said diverted flow of fluid; and means actuated by said restricted, diverted fluid flow for adjusting the means controlling the fluid circulation.

43. An hydraulic shock absorber having a fluid reservoir, two fluid compression chambers and means for circulating fluid between said chambers; pressure operated means for controlling said fluid circulation; means adapted to divert a flow of fluid from said circulation into the fluid reservoir; an inertia weight controlled valve adapted to restrict said diverted flow of fluid in response to accelerative movements of the shock absorber; and means actuated by said restricted, diverted flow for increasing the controlling effect of the pressure operated means on the fluid circulation.

44. An hydraulic shock absorber comprising a casing having a fluid reservoir and a cylinder; a piston in said cylinder forming two compression chambers therein, reciprocation of said piston circulating fluid between said compression chambers and the fluid reservoir; means for controlling the circulation of fluid between the compression chambers; inertia means for controlling the circulation between a compression chamber and the fluid reservoir; and means responsive to the inertia controlled fluid circulation for adjusting the means controlling the circulation between compression chambers.

45. An hydraulic shock absorber comprising, in combination, a casing providing a cylinder in which a piston forms a compression chamber; a port of exit for the fluid in said chamber; and means including a valve having two portions of different areas adapted to be exposed to fluid pressure and an inertia mass controlled valve for determining the fluid pressure within said chamber.

46. An hydraulic shock absorber comprising, in combination, a casing providing a cylinder in which a piston forms a compression chamber; a port of exit for the fluid in said chamber; and means including a valve adapted to have fluid pressure exerted against opposite sides thereof to move it in one direction or the other and an inertia mass controlled valve adapted to control the fluid pressure on one side of the first mentioned valve for regulating the flow of fluid from the port.

47. An hydraulic shock absorber comprising, in combination, a casing providing a cylinder in which a piston forms a compression chamber; a port of exit for the fluid in said chamber; and means including a spring loaded multiplying valve and an inertia mass controlled valve for regulating the flow of fluid from said port.

48. An hydraulic shock absorber comprising, in combination, a casing; means for circulating fluid under pressure in one direction through said casing; means adapted to be actuated in opposite directions by fluid pressure for controlling said fluid circulation; and an inertia mass controlled device, separate from said means, for regulating the fluid pressure acting upon said means in one direction.

49. An hydraulic shock absorber for controlling the relative movements between the body and axles of a vehicle comprising, in combination, a casing providing a cylinder in which a piston forms a compression chamber; a port of exit for said chamber; pressure operated means normally closing said port and adapted to establish and control a flow of fluid therefrom; and an inertia mass controlled device for controlling said pressure operated means proportionately to the rate of change in the vertical velocities of the vehicle body.

50. An hydraulic shock absorber comprising, in combination, a casing providing a cylinder in which a piston forms a compression chamber; an exit port for said chamber; a valve adapted to establish a main and a secondary flow of fluid from said port said valve having a portion providing a piston adapted to be moved by the pressure of the secondary flow to adjust the valve to control the main flow; and an inertia mass controlled device for determining the degree of pressure of the secondary flow in proportion to accelerative movements of the casing.

51. An hydraulic shock absorber having a fluid flow control device for determining the degree of resistance offered by the shock absorber said device having means adapted to be affected by fluid pressure for adjusting said device to vary the resistance offered by the shock absorber; and an inertia weight controlled device adapted to render said adjusting means effective in response and proportion to accelerative movements of the shock absorber.

52. An hydraulic shock absorber having a spring loaded valve for determining the degree of shock absorber resistance said valve having surfaces adapted to be acted upon by fluid pressure to adjust said valve; and an inertia weight controlled device adapted to control fluid flow and thereby regulate fluid pressure effective to adjust the valve for increasing the resistance of the shock absorber in response and proportion to accelerative movements of the shock absorber.

53. A hydraulic shock absorber comprising, in combination, a casing providing a cylinder in which a piston forms a fluid displacement chamber; a port of exit for said chamber, and means including separate but cooperating fluid flow control devices, one, adapted to be actuated by fluid pressure to permit a fluid flow both through and around it, the other an inertia weight controlled valve adapted to regulate the flow of fluid through the first mentioned valve to effect control of the fluid flow around said first mentioned valve.

54. An hydraulic shock absorber having a fluid flow control device for determining the degree of resistance offered by the shock absorber; means for adjusting said device to vary the resistance offered by the shock absorber; and an inertia weight controlled device adapted to render said adjusting device effective in response and proportion to accelerative movements of the shock absorber.

55. An hydraulic shock absorber having a spring loaded valve for determining the degree of shock absorber resistance; means adapted to be actuated by fluid pressure to adjust said valve; and an inertia weight controlled device adapted to render the aforementioned means effective to adjust the valve for increasing the resistance of the shock absorber in response and proportion to accelerative movements of the shock absorber.

56. A hydraulic shock absorber having a fluid displacement chamber provided with an outlet; an inertia valve for controlling the flow of a portion of the fluid from said outlet; a restricting passage for keeping the quantity of the fluid supplied to said inertia valve relatively small; and a valve in said outlet having differential areas, one of said areas being acted upon by the fluid pressure from said chamber, and the other of said areas being acted upon by the fluid pressure directly controlled by said inertia valve.

57. A hydraulic shock absorber having a fluid containing chamber provided with an outlet port; an inertia valve; a valve in said port having differential areas, one of said areas being acted upon by the fluid pressure from said chamber, and the other of said areas being acted upon by fluid pressure controlled by said inertia valve.

58. In an inertia controlled hydraulic shock absorber having a fluid displacement chamber provided with fluid discharge means, valve means in said fluid discharge means adapted to control the pressure of the fluid in said displacement chamber by controlling the flow of fluid through said fluid discharge means, and inertia means for controlling the operation of said valve means, said valve means providing, for one phase of operation of said inertia means, for a relatively low substantially predetermined pressure which must be exceeded before fluid may flow from said displacement chamber through said fluid discharge means, and providing also, for another phase of operation of said inertia means, for a substantially predetermined pressure higher than said low substantially predetermined pressure which must be attained before fluid may flow from said displacement chamber through said fluid discharge means.

59. In an inertia controlled hydraulic shock absorber having a fluid displacement chamber provided with fluid discharge means and containing a fluid, said fluid discharge means including for at least a portion of its length two conduits for the fluid that is to flow from said displacement chamber, means for varying the volume of the displacement chambers to thus cause fluid to flow from said displacement chamber through said fluid discharge means, fluid flow control means in one of the conduits, fluid flow control means in the other of the conduits, and inertia means adapted to operate said second mentioned fluid flow control means to closed position whereby said fluid discharge means is caused to offer a substantially predetermined relatively high resistance to flow of fluid so as to maintain a substantially fixed relatively high pressure in the displacement chamber, said first named fluid flow control means being adapted, when said inertia means does not act on said second mentioned fluid flow control means, to cause said fluid discharge means to offer a substantially predetermined relatively low resistance to fluid flow so as to maintain a substantially fixed relatively low pressure in the displacement chamber.

CLINTON R. HANNA.